United States Patent
Mathony et al.

(10) Patent No.: US 8,605,948 B2
(45) Date of Patent: Dec. 10, 2013

(54) DRIVER ASSISTANCE SYSTEM FOR MONITORING DRIVING SAFETY AND CORRESPONDING METHOD FOR DETECTING AND EVALUATING A VEHICLE MOVEMENT

(75) Inventors: Hans-Joerg Mathony, Tamm-Hohenstange (DE); Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 289 days.

(21) Appl. No.: 12/734,766

(22) PCT Filed: Oct. 13, 2008

(86) PCT No.: PCT/EP2008/063728
§ 371 (c)(1),
(2), (4) Date: Aug. 26, 2010

(87) PCT Pub. No.: WO2009/071365
PCT Pub. Date: Jun. 11, 2009

(65) Prior Publication Data
US 2010/0316255 A1 Dec. 16, 2010

(30) Foreign Application Priority Data
Dec. 6, 2007 (DE) .......................... 10 2007 058 542

(51) Int. Cl.
*G06K 9/00* (2006.01)

(52) U.S. Cl.
USPC ........................................................ 382/104

(58) Field of Classification Search
USPC .......... 382/100–107; 340/907–911, 933–940; 348/113–120
See application file for complete search history.

(56) References Cited

U.S. PATENT DOCUMENTS

| | | | | |
|---|---|---|---|---|
| 5,983,157 A | * | 11/1999 | Sugitani | 701/400 |
| 2002/0049534 A1 | * | 4/2002 | Yuda et al. | 701/209 |
| 2006/0075422 A1 | | 4/2006 | Choi et al. | |
| 2006/0095199 A1 | * | 5/2006 | Lagassey | 701/117 |
| 2007/0124078 A1 | * | 5/2007 | Vinje | 701/301 |
| 2007/0256499 A1 | * | 11/2007 | Pelecanos et al. | 73/579 |
| 2008/0042812 A1 | * | 2/2008 | Dunsmoir et al. | 340/435 |

FOREIGN PATENT DOCUMENTS

| | | |
|---|---|---|
| DE | 199 82 422 | 3/2003 |
| DE | 10 2005 049 881 | 10/2006 |
| EP | 1 643 769 | 4/2006 |
| EP | 1 826 736 | 8/2007 |
| JP | 8-202999 | 8/1996 |

OTHER PUBLICATIONS

JP 8-202999 Machine Translation.*

* cited by examiner

*Primary Examiner* — Atiba O Fitzpatrick
(74) *Attorney, Agent, or Firm* — Kenyon & Kenyon LLP

(57) ABSTRACT

A driver assistance system for monitoring driving safety has a mobile electronic unit including a video sensor, a computer unit for image data processing, and an acoustic output unit, which detects the immediate surroundings of the vehicle from the data of the video sensor and outputs a warning or information via an output unit when the computer unit detects a dangerous situation. The mobile electronic unit detects noises within the vehicle or from the outside via an acoustic input unit, and incorporates the information in the assessment of driving safety.

27 Claims, 3 Drawing Sheets

DRIVER ASSISTANCE SYSTEM FOR MONITORING DRIVING SAFETY AND CORRESPONDING METHOD FOR DETECTING AND EVALUATING A VEHICLE MOVEMENT

BACKGROUND OF THE INVENTION

1. Field of the Invention

The present invention relates to a driver assistance system for monitoring driving safety, having a mobile electronic unit including a video sensor, a computer unit for image data processing and an acoustic output unit, which detects the immediate surroundings of the vehicle from the data of the video sensor and outputs a warning or information via an output unit when the computer unit detects a hazardous situation, and to a corresponding method for detecting and evaluating a vehicle movement.

2. Description of Related Art

For active support of the driver of a vehicle in various traffic situations, there are known automatic driver assistance systems which provide the driver with useful information in navigating through the road traffic. In addition, published German patent document DE 199 82 422 and published European patent document EP 1826736 A1 describe systems for recognizing road signs, helping the driver to maneuver safely in complicated traffic situations. In addition to the known navigation systems, which display satellite-supported navigation data, there are known driver assistance systems, which help the driver in staying in his lane by acoustic signals and therefore give the driver warnings, for example, to detect fatigue and thereby prevent accidents. Since such systems are usually expensive and are mostly used only in new vehicles, it is proposed in published German patent document DE 10 2005 049 881 A1 that these systems be replaced by cellular telephones, most of which at the time of this patent application have an efficient camera with an equally efficient computer unit for processing the camera images. According to the last-cited document, the lane recognition function should be introduced into a cellular telephone via software, so that the cellular telephone which is positioned in a mounting cradle on the dashboard outputs a warning tone via the ringtone function of the cellular telephone when the approach to a lane change is detected. Due to the high reflectivity of most road markings, detection of a lane change is possible with a relatively high reliability, because the high contrast created due to the strong reflection supports automatic recognition of the road marking in the image data.

However, one disadvantage of the method cited above is a very one-sided and undifferentiated recognition of a lane change, resulting in frequent and unnecessary alarms. This may result in the driver deactivating the system or simply ignoring it due to the large number of warnings delivered unnecessarily.

BRIEF SUMMARY OF THE INVENTION

The present invention provides a driver assistance system for monitoring driving safety; this system is able to detect deviations in a more differentiated manner than the known driver assistance systems based on a mobile electronic unit. This is achieved by the mobile electronic unit detecting acoustic signals via an acoustic input unit and including these signals in the assessment of driving safety. Additional advantageous embodiments of the present invention are provided in the subclaims.

A wide choice of small electronic devices are available as mobile electronic units, for example, cellular telephones, personal digital assistants (PDAs) having digital cameras, digital music playback devices (MP3 players having a digital camera), miniature video cameras, or digital cameras, as well as personal navigation devices (PND), which also have integrated voice recognition for control, and portable minicomputers, and the number of devices having a video sensor is constantly growing.

According to the present invention, it is proposed that the mobile electronic unit shall detect additional signals from the surroundings to differentiate the assessment of the deviation from regular traffic. In contrast with permanently installed driver assistance systems, which have access to a large volume of data from the electronic bus system of a motor vehicle, this abundance of information is not accessible to the available mobile electronic units. The acoustic surroundings of the mobile electronic unit, for example, nevertheless supply valuable information for an additional differentiated assessment of a hazardous situation in road traffic. The number of false alarms may be reduced in an advantageous and desirable manner by including additional data, in particular acoustic information.

The advantage of using acoustic signals is also that a hardwired connection to the system bus of the vehicle is not necessary for detection of the turn indicator, which results in increased acceptance by the user because there is no intervention in the function of the vehicle, which is not only expensive but also entails the risk of an unacceptable function of the vehicle after the intervention. The acoustic connection instead of a hard wired connection thus offers an improvement in the recognition function while at the same time offering increased acceptance by users.

In a first embodiment of the present invention, the mobile electronic unit detects surrounding acoustic noises in a learning mode and assigns them to certain preselected events.

In an example embodiment, the typical clicking noise of a turn indicator in the vehicle is detected by the mobile electronic unit and is used for training a programmable acoustic filter. As soon as the mobile electronic unit, after the end of the learning mode, has filtered out the clicking of a turn indicator from the superimposed driving noises and music in the automobile, if applicable, an internal signal is triggered, suppressing the warning function when a lane change is detected by the mobile electronic unit. This has the advantage that intentional lane changing does not result in a false alarm because it may be assumed that in this case the lane change is not done unintentionally because of driver fatigue. The learning mode may be activated at the time of the initial use of the driver assistance system, and the voice recognition function which is usually already available is used to reliably detect the noise of the turn indicator. It is also possible to activate the learning mode at different speeds to allow the voice recognition system to have a differentiated and thus reliable detection of the noise of the turn indicator. The noise of the turn indicator which is detected in the learning mode in initial operation is then saved and is thereafter available to the system for detection of the turn indicator.

In another embodiment of the present invention, the mobile electronic unit learns not only the noise of the turn indicator, but also other typical driving noises such as engine noises from which it is possible to derive the rotational speed of the engine and therefore the speed of the vehicle, additional signaling noises and/or warning noises of the vehicle itself such as acoustic approach signals of a vehicle from a radar assisted distance control or warnings of a cruise control, honking noises of one's own vehicle or other vehicles as well as sirens.

Detection of a siren may result in, for example, the instruction to stay on the right within the right lane or to stay on the left within the left lane. It is also possible to signal to the driver to reduce his speed.

Through additional acoustic detection according to the present invention, the driver assistance function may thus be improved substantially because the system is able to put the deviations that are detected into perspective in relation to other parameters and thereby reduce the number of false alarms.

In another embodiment of the present invention, the system detects road traffic signs, in particular speed limits and the end of speed limits, and signals the detected limits and the end thereof by acoustic and/or visual signals. It is also possible to output the meaning of the traffic sign detected by natural speech, so that the driver is instructed acoustically by voice in the event he has overlooked the sign. The mobile electronic unit is also able to ascertain additional information from the moving images of the built-in camera and include this in the assessment of the deviation from regular traffic.

In addition to ascertaining the vehicle speed, it is also possible to deduce the prevailing speed on the basis of the speed of objects passing by such as road signs or road markers. The typical distortion of the image due to the central projection and due to the typically short focal distance of most electronic devices in combination with a lens, which is often not of a very high quality, is an advantage here. The objects are therefore distorted as a function of distance, and points detected with a high contrast, for example, in road signs or corners of a road marker, follow typical trajectories on the image surface deviating from a straight line because of the aforementioned causes. Due to the significant deviations and the speed, which is usually not constant, toward the edges and corners of the images, it is thus possible to deduce the speed of the object passing by, so that the object distance may be ascertained from the distortion. In addition, the mobile electronic unit may be trained by activating a learning mode at a constant speed.

Additional details of the vehicle environment may also enter into the assessment, such as the relative speed in comparison with other vehicles. Furthermore, any slow vehicles or vehicles making sudden lane changes may be detected and indicated by acoustic and/or visual warning. In many cases, a driver is distracted from traffic and thus also does not perceive transient acoustic warnings, so it is advantageous if the latest acoustic warning or instruction is displayed visually on a display, e.g., by displaying the latest road sign detected.

In a special embodiment of the present invention, the mobile electronic unit has navigation means and includes the information thereby obtained in the assessment of the deviation from regular traffic, for example, to detect the type of road on which the vehicle is driving, i.e., a highway or rural road or whether the vehicle is in a public area or in a nonpublic area.

To prevent the driver assistance system from being turned off or ignored by the driver, it is advantageous if hazardous situations detected are classified in more than one class. In this way, the driver is able to select among various operating modes, for example, a wordy and very cautious mode or a mode which activates a warning and/or instruction signal only when there is a higher risk potential.

In another embodiment of the present invention, it is possible for the detected deviations to be analyzed statistically by the driver assistance system. The driver is able in this way to assess his own driving safety or to store assumed habitual driving errors. It is also possible in this way to assess the degree of safety of a beginning driver, in which case a decline in hazardous situations detected by the system would indicate an improvement in the driver's own driving safety.

In an example embodiment of the present invention, the system detects infrared radiation, in particular in the form of small dots in the image, while detecting the speed at the same time. A small and intense dot in the image of a mobile electronic unit indicates that one's own vehicle has been detected by an infrared laser, and most video sensors of mobile electronic units are sensitive to infrared radiation, which is invisible to the human eye. Detection by an infrared laser in turn indicates a speed measurement by the police, so the driver is immediately informed about whether or not there is speed detection.

DETAILED DESCRIPTION OF THE INVENTION

Figure 1:
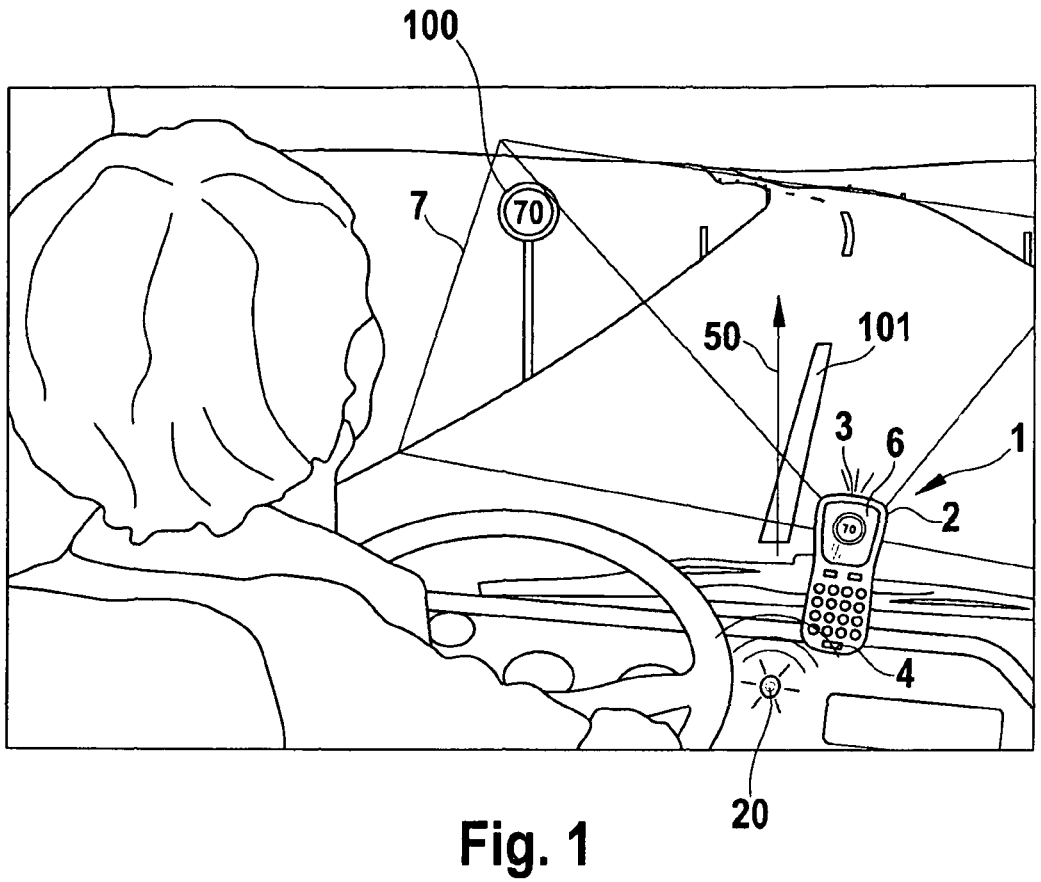
FIG. 1 shows a driver assistance system according to the present invention.

FIG. 1 shows a driver assistance system according to the present invention in use in a driver's cab of a truck, but the driver assistance system is not limited to use in trucks. The driver assistance system here is implemented by a cellular telephone as a mobile electronic unit 1, which has a video sensor 2 at the rear in the direction of travel. Acoustic output unit 3 is implemented in the form of the loudspeaker of the cellular telephone, which in the normal case is used to output music or polyphonic ring tones. The voice microphone is used as acoustic input unit 4 or, if available, a microphone for recording noise and speech in video recording is used. During use, the cellular telephone is installed on a mounting device on the dashboard, so that the cellular telephone is aligned with video sensor 2 in the direction of travel, having optical detection angle 7 via which video sensor 2 is able to detect road signs 100 and/or center lines 101 at the edge of the road. If a lane change 50 is detected by the driver assistance system, the driver assistance system detects acoustic signals from the driver's cab, for example, the clicking noise of a turn indicator display 20, and outputs an alarm only when a lane change 50 is detected but no turn indicator noise is picked up at the same time. The acoustic signal of turn indicator display 20 thus suppresses the warning about a lane change 50. In addition to detecting a lane change 50, the driver assistance system diagrammed here also detects a road sign 100 on the left side of the road, recognizes the meaning and displays road sign 100 in a visual display unit 6, namely here in the display of the cellular telephone, and additionally outputs the meaning of road sign 100 thereby detected in natural language via acoustic output unit 3, namely the loudspeaker of the cellular telephone here.

Figure 2:
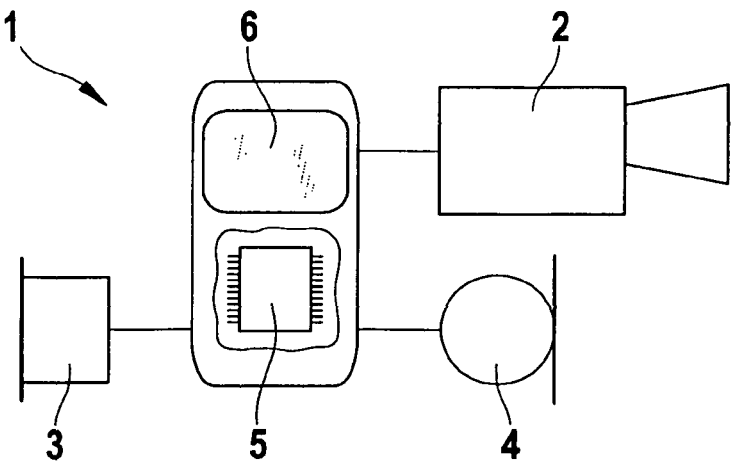
FIG. 2 shows a block diagram of a driver assistance system according to the present invention in a first embodiment variant.

FIG. 2 shows individual elements 2, 3, 4, 5 and 6 of a generic mobile electronic unit 1 in a block diagram, where this unit 1 may be a video camera, a digital camera, a cellular telephone, a digital music player, a minicomputer or a personal digital assistant (PDA) or some other small mobile device having electronic components. Mobile electronic unit 1 has a video sensor 2, an acoustic output unit 3, an acoustic input unit 4, a computer unit 5 for image calculation, and optionally a visual display unit 6.

Figure 3:
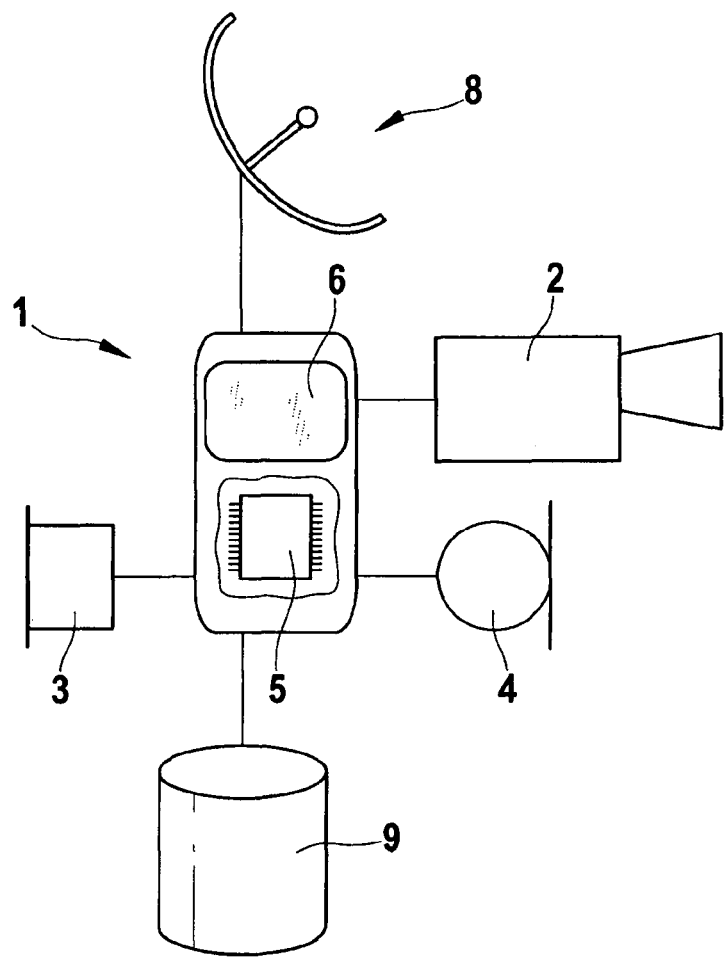
FIG. 3 shows a block diagram of a driver assistance system according to the present invention in another embodiment variant.

FIG. 3 shows the generic electronic unit 1 expanded by an antenna 8 for receiving navigation data and a database 9 for comparing the navigation data with a digital map represented internally. A small device equipped with means 8 and 9 for navigation detects the prevailing traffic situation and compares the situation detected with data in database 9 and navigation data and recognizes on that basis whether there is a speed limit, for example, because the driver assistance system is being used in a vehicle on a rural road.

Figure 4:
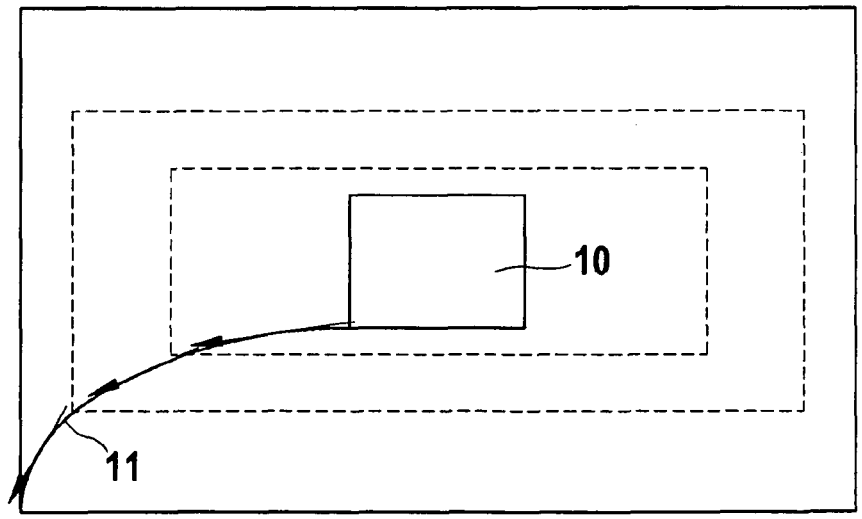
FIG. 4 shows a diagram to illustrate speed detection from video data.

FIG. 4 schematically shows how, in a particular embodiment of the present invention, the driver assistance system detects the prevailing speed by detecting an object 10 in the image and its lower left corner following plotted trajectory 11. The driver assistance system determines the actual distance from the type of trajectory 11, which is different for each distance of object 10 from the video sensor, and the driver assistance system determines the prevailing speed via the time required by object 10 for trajectory 11. The speed thereby ascertained is then compared with the meaning of a road sign detected; an acoustic alarm is output in the event the speed thereby ascertained is above a detected speed limit. The object detected may be a center line or a road sign, both of which are stationary, or it may be another vehicle, in which case the relative speed of one's own vehicle is ascertained in comparison with the speed of the other vehicle.

Figure 5:
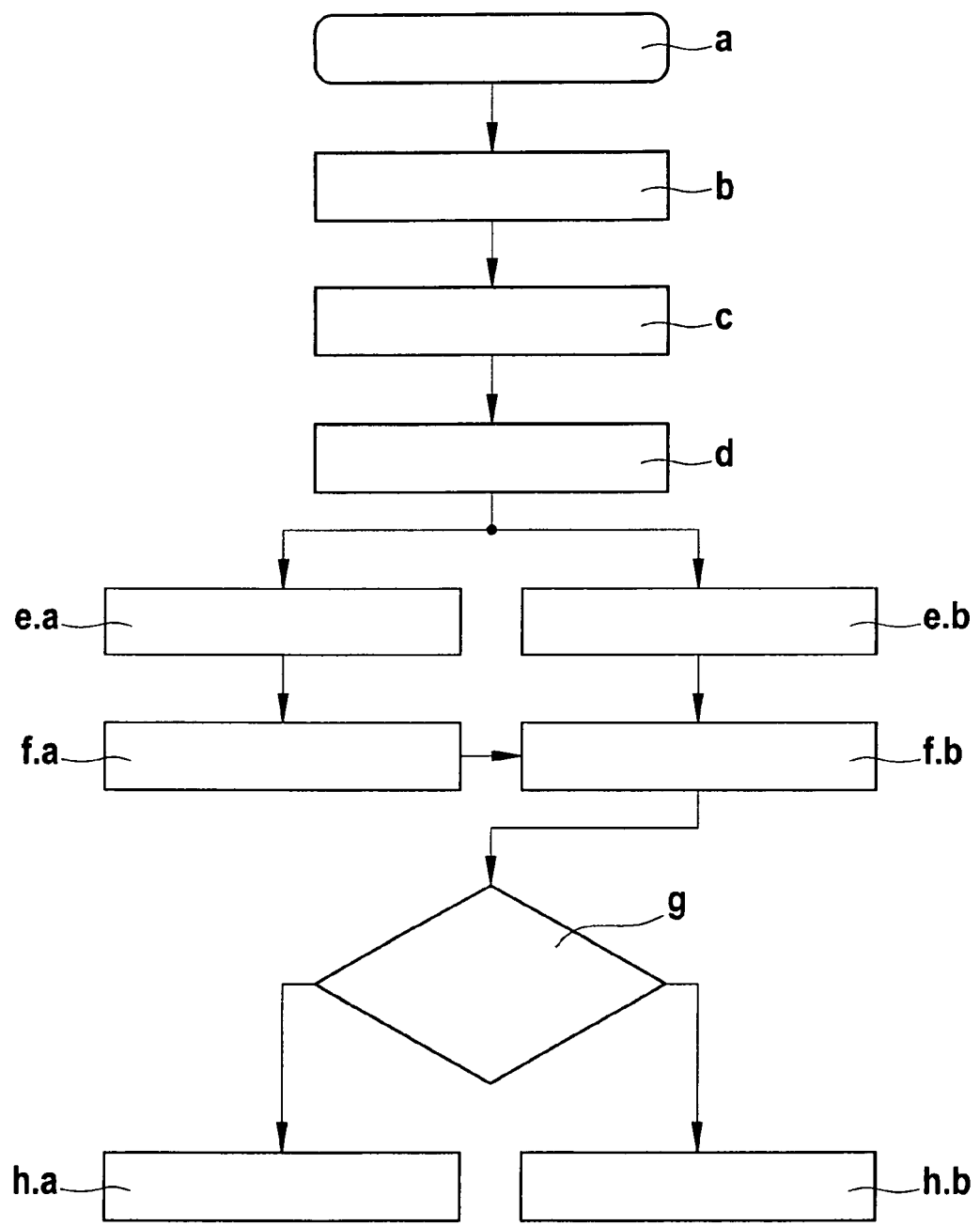
FIG. 5 shows a flow chart of the method according to the present invention.

FIG. 5 shows a flow chart, which includes the steps of the method for automatic detection and evaluation of a vehicle movement, advantageously implemented by a program in a mobile electronic unit. First step a includes recording video data from the moving vehicle, this step a being followed by step b, which includes detection of preselected high-contrast objects, such as road signs and road markings. This is followed by a comparison of the movements with movements calculated in advance in step c, and then in step d, differences between the previously calculated movements and the detected movements are recognized. Simultaneously with the detection of acoustic signals from the immediate surroundings of the vehicle and/or the interior of the vehicle in step e.a, the evaluation of the movement detected as movement events then follows in step e.b. The acoustic signals detected in step e.a are filtered and detected in step f.a, and in step f.b the noises detected are gated with the movement events detected. This is followed by a decision in step g about the type of change in the evaluation due to the gating in step f.b. Depending on the outcome of the decision in step g, the evaluation is changed, namely in such a way that the movement event detected results in an alarm h.a or no alarm h.b.

What is claimed is:

1. A driver assistance system configured as a mobile electronic unit for monitoring driving safety of a vehicle, comprising:

a video sensor;

an acoustic input unit configured to detect acoustic signals, wherein the acoustic signals are detected in a learning mode;

a computer unit configured detect a hazardous driving situation for the vehicle, wherein the computer unit is configured to perform the following as part of the detection of the hazardous driving situation: (a) image data processing to analyze the surroundings of the vehicle from data output by the video sensor, and (b) acoustic data processing to analyze acoustic signals detected by the acoustic input unit; and an output unit configured to output at least one of a warning and instruction when the computer unit detects a hazardous driving situation for the vehicle;

wherein the acoustic signals include at least one of a turn indicator noise, an acoustic warning signal from the vehicle, and an acoustic instruction signal from the vehicle.

2. A driver assistance system configured as a mobile electronic unit for monitoring driving safety of a vehicle, comprising:

a video sensor;

an acoustic input unit configured to detect acoustic signals, wherein the acoustic signals are detected in a learning mode;

a computer unit configured detect a hazardous driving situation for the vehicle, wherein the computer unit is configured to perform the following as part of the detection of the hazardous driving situation: (a) image data processing to analyze the surroundings of the vehicle from data output by the video sensor, and (b) acoustic data processing to analyze acoustic signals detected by the acoustic input unit; and an output unit configured to output at least one of a warning and instruction when the computer unit detects a hazardous driving situation for the vehicle;

wherein the acoustic signals include at least one of a turn indicator noise, an engine noise, an acoustic warning signal from the vehicle, an acoustic instruction signal from the vehicle, a sound of a horn from the vehicle, and a sound of a horn from an adjacent vehicle, and wherein the acoustic signals include a turn indicator noise, an engine noise, an acoustic warning signal from the vehicle, and an acoustic instruction signal from the vehicle.

3. The driver assistance system as recited in claim 2, wherein the mobile electronic unit is configured to: (a) detect at least one of traffic signs and traffic participants, and (b) acoustically output spoken information regarding the detected at least one of traffic signs and traffic participants.

4. The driver assistance system as recited in claim 2, wherein the mobile electronic unit is configured to detect vehicle speed from the data of the video sensor.

5. The driver assistance system as recited in claim 2, wherein the output unit includes a visual output unit configured to display the at least one of the warning and instruction.

6. The driver assistance system as recited in claim 5, wherein the output unit further includes an acoustic output unit.

7. The driver assistance system as recited in claim 2, further comprising:

a navigation unit configured to provide current navigation information including the position of the vehicle and the road on which the vehicle is traveling, wherein the current navigation information is assessed by the computer unit in comparison to a reference road environment to determine a deviation from the reference road environment.

8. The driver assistance system as recited in claim 7, wherein the computer unit classifies a hazardous driving situation for the vehicle in one of multiple hazard categories, and wherein multiple operating modes are provided, and wherein in one of the operating modes the at least one of the warning and instruction is output only for a high-risk-potential hazard category.

9. The driver assistance system as recited in claim 7, wherein the computer unit is configured to summarize multiple determined deviations in statistical form.

10. The driver assistance system as recited in claim 4, wherein the system is further configured to detect an infrared laser radiation from the data of the video sensor.

11. The driver assistance system located in a vehicle for automatic detection and evaluation of a vehicle movement, comprising:
- a video recorder configured to record video data;
- means for recognizing preselected high-contrast objects in the immediate surroundings of the vehicle;
- means for comparing a detected vehicle movement with a previously calculated vehicle movement calculated based on the assumption of a constant and linear movement of the vehicle, wherein a difference between the detected movement and the previously calculated movement is determined;
- means for detecting acoustic signals from at least one of the immediate surroundings of the vehicle and the interior of the vehicle;
- means for filtering and recognizing preselected noises from the detected acoustic signals;
- means for evaluating the determined difference between the detected movement and the previously calculated movement; and
- means for gating a result of the evaluation of the determined difference with the recognized preselected noises, and determining, based on the gating, a type of evaluation event.

12. A method for automatic detection and evaluation of a vehicle movement, comprising:
- recording, using a video sensor, video data from a moving vehicle;
- detecting preselected high-contrast objects in the immediate surroundings of the vehicle from the recorded video data;
- comparing a detected vehicle movement with a previously calculated vehicle movement calculated based on the assumption of a constant and linear movement of the vehicle, wherein a difference between the detected movement and the previously calculated movement is determined;
- detecting acoustic signals from at least one of the immediate surroundings of the vehicle and the interior of the vehicle;
- filtering and recognizing preselected noises from the detected acoustic signals;
- evaluating the determined difference between the detected movement and the previously calculated movement;
- gating a result of the evaluation of the determined difference with the recognized preselected noises; and
- determining, based on the gating, a type of evaluation event.

13. The method as recited in claim 12, further comprising:
- determining, using navigation data, current navigation information including a current position of the vehicle and the road on which the vehicle is traveling;
- comparing the current navigation information with a reference road environment to determine a deviation from the reference road environment; and
- gating the determined deviation with the recognized preselected noises.

14. The method as recited in claim 12, further comprising:
- detecting the current distance and the rate of approach of the vehicle to at least one other vehicle; and
- gating the current distance and the rate of approach with the recognized preselected noises.

15. The method as recited in claim 12, further comprising:
- comparing the detected high-contrast objects with stored representations of road signs; and
- gating the result of the comparison with the recognized preselected noises.

16. The method as recited in claim 12, further comprising:
- calculating the speed of the vehicle from speed of the detected high-contrast objects relative to the vehicle; and
- determining a distance of the vehicle from the high-contrast objects using a nonlinear distortion of the objects used for the video sensor.

17. The driver assistance system located in a vehicle for automatic detection and evaluation of a vehicle movement, comprising:
- a video recorder configured to record video data;
- a recognizing arrangement for recognizing preselected high-contrast objects in the immediate surroundings of the vehicle;
- a comparing arrangement for comparing a detected vehicle movement with a previously calculated vehicle movement calculated based on the assumption of a constant and linear movement of the vehicle, wherein a difference between the detected movement and the previously calculated movement is determined;
- a detecting arrangement for detecting acoustic signals from at least one of the immediate surroundings of the vehicle and the interior of the vehicle;
- a filtering arrangement for filtering and recognizing preselected noises from the detected acoustic signals;
- an evaluating arrangement for evaluating the determined difference between the detected movement and the previously calculated movement; and
- a gating arrangement for gating a result of the evaluation of the determined difference with the recognized preselected noises, and determining, based on the gating, a type of evaluation event.

18. The driver assistance system as recited in claim 1, wherein the system is located in the vehicle.

19. A driver assistance system configured as a mobile electronic unit for monitoring driving safety of a vehicle, comprising:
- a video sensor;
- an acoustic input unit configured to detect acoustic signals, wherein the acoustic signals are detected in a learning mode;
- a computer unit configured detect a hazardous driving situation for the vehicle, wherein the computer unit is configured to perform the following as part of the detection of the hazardous driving situation: (a) image data processing to analyze the surroundings of the vehicle from data output by the video sensor, and (b) acoustic data processing to analyze acoustic signals detected by the acoustic input unit; and
- an output unit configured to output at least one of a warning and instruction when the computer unit detects a hazardous driving situation for the vehicle;
- wherein the acoustic signals include at least one of a turn indicator noise, an engine noise, an acoustic warning signal from the vehicle, and an acoustic instruction signal from the vehicle, and
- wherein the acoustic signals include a turn indicator noise, an engine noise, an acoustic warning signal from the vehicle, and an acoustic instruction signal from the vehicle.

20. The driver assistance system as recited in claim 19, wherein the mobile electronic unit is configured to: (a) detect at least one of traffic signs and traffic participants, and (b) acoustically output spoken information regarding the detected at least one of traffic signs and traffic participants.

21. The driver assistance system as recited in claim 19, wherein the mobile electronic unit is configured to detect vehicle speed from the data of the video sensor.

22. The driver assistance system as recited in claim 19, wherein the output unit includes a visual output unit configured to display the at least one of the warning and instruction.

23. The driver assistance system as recited in claim 22, wherein the output unit further includes an acoustic output unit.

24. The driver assistance system as recited in claim 19, further comprising:
 a navigation unit configured to provide current navigation information including the position of the vehicle and the road on which the vehicle is traveling, wherein the current navigation information is assessed by the computer unit in comparison to a reference road environment to determine a deviation from the reference road environment.

25. The driver assistance system as recited in claim 24, wherein the computer unit classifies a hazardous driving situation for the vehicle in one of multiple hazard categories, and wherein multiple operating modes are provided, and wherein in one of the operating modes the at least one of the warning and instruction is output only for a high-risk-potential hazard category.

26. The driver assistance system as recited in claim 24, wherein the computer unit is configured to summarize multiple determined deviations in statistical form.

27. The driver assistance system as recited in claim 21, wherein the system is further configured to detect an infrared laser radiation from the data of the video sensor.

* * * * *

UNITED STATES PATENT AND TRADEMARK OFFICE
CERTIFICATE OF CORRECTION

PATENT NO.        : 8,605,948 B2                                              Page 1 of 1
APPLICATION NO.   : 12/734766
DATED             : December 10, 2013
INVENTOR(S)       : Mathony et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 441 days.

Signed and Sealed this
Twenty-second Day of September, 2015

Michelle K. Lee
*Director of the United States Patent and Trademark Office*